March 17, 1931. J. O. CARREY 1,796,439
CENTRIFUGAL CLUTCH MECHANISM FOR SECTIONAL FLY WHEELS
Filed July 23, 1926 2 Sheets-Sheet 2
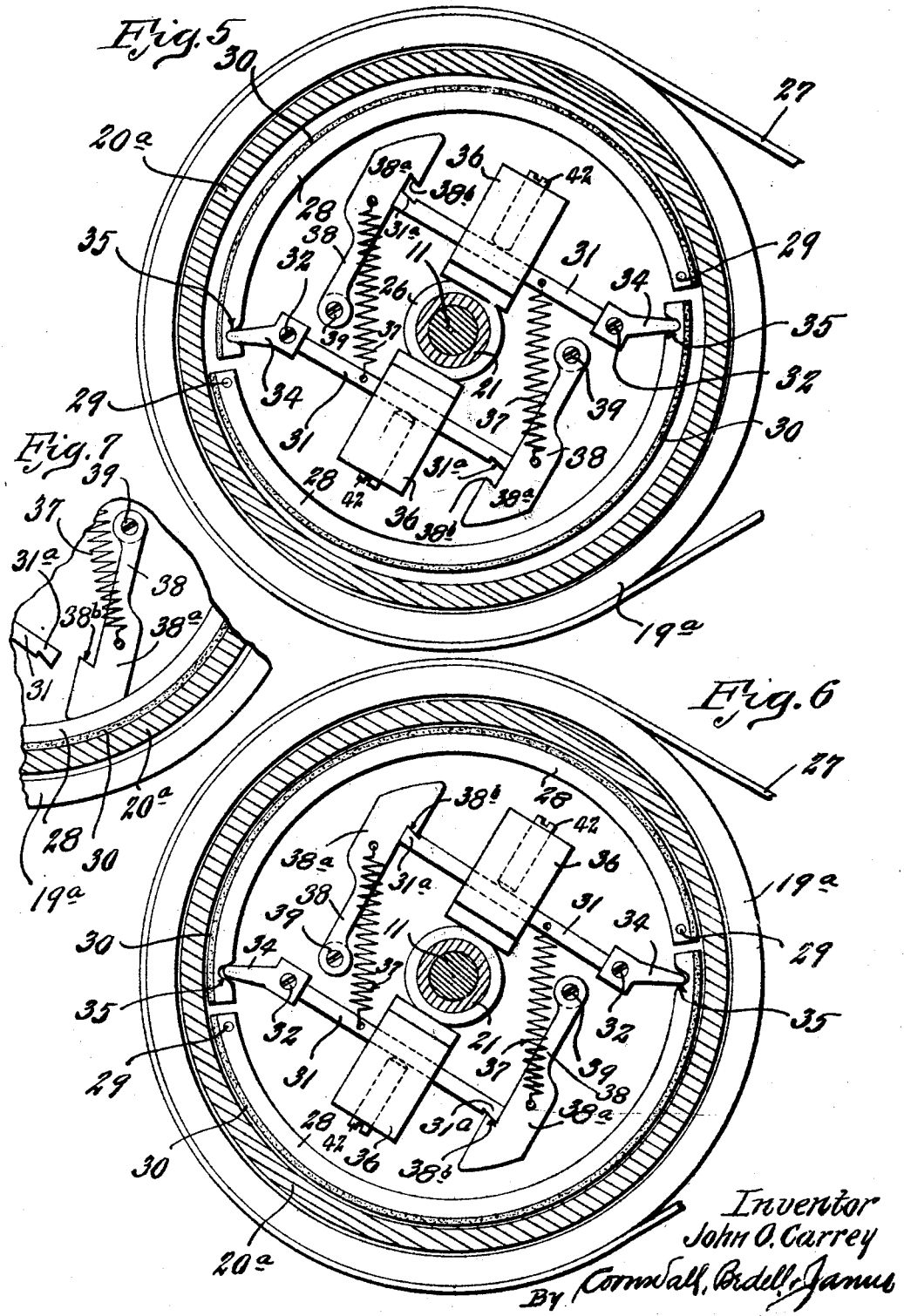
Inventor
John O. Carrey
By Cornwall, Ordell, Janus Patented Mar. 17, 1931

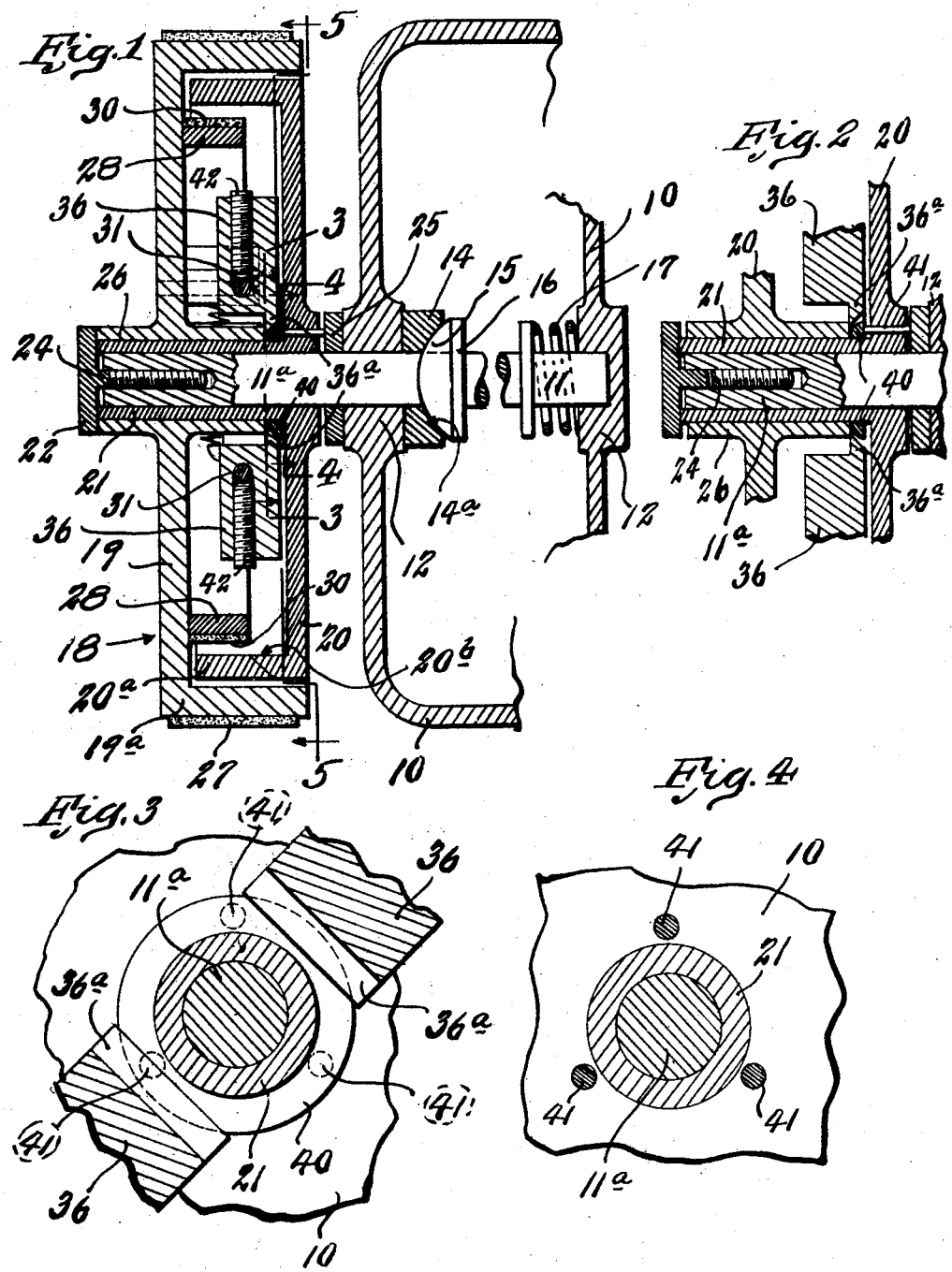

1,796,439

UNITED STATES PATENT OFFICE

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI

CENTRIFUGAL CLUTCH MECHANISM FOR SECTIONAL FLYWHEELS

Application filed July 23, 1926. Serial No. 124,348.

This invention relates to new and useful improvements in driving mechanisms for compressors, pumps, refrigerating apparatus, and the like, the primary object of the invention being to provide a device having a series of fly wheel sections adapted to be set in operation progressively in order to relieve the motor or other prime mover of excessive starting torque, and at the same time allow the use of a fly wheel having the required weight necessary for the efficient operation of the apparatus.

Further objects of the invention are to construct the clutching means utilized to interengage the fly wheel sections so as to render said clutching means readily responsive to the various speeds and make it positive in operation so as to effect proper disengagement and interengagement of the fly wheel sections at the desired speeds.

Other objects of the invention are to provide a seal for the shaft of the device, which seal is placed under an increased pressure when the device is stationary and which auxiliary or increased pressure is removed from said seal when the shaft is actuated so as to prevent excessive friction between the seal members.

Still other objects of the invention are to correlate the operation of said clutching means with said seal members so that said auxiliary pressure is removed from said seal members as soon as the clutching means is set in operation.

Additional objects of the invention are to generally improve upon and simplify the construction of the fly wheel and shaft seals as used particularly for compressors in refrigerating systems.

With these and other objects in view, my invention consists in certain novel features of construction and arrangement of parts, hereinafter more fully described and claimed, and illustrated in the accompanying drawings, in which—

Figure 1 is a vertical longitudinal section through the device and showing the operating parts thereof occupying positions when the device is at rest.

Figure 2 is a fragmental sectional view of the fly wheel sections and the shaft and showing the parts occupying positions when the shaft is in operation.

Figure 3 is a detail view taken on line 3—3 of Figure 1.

Figure 4 is a detail view taken on line 4—4 of Figure 1.

Figure 5 is a transverse cross section taken on line 5—5 of Figure 1.

Figure 6 is a similar view but showing the clutching means partly engaged.

Figure 7 is a fragmental detail view showing the clutching means entirely engaged and the fly wheel sections in interengaged relation.

Referring by numerals to the accompanying drawings, 10 indicates a casing which it is desired to seal, such as a compressor casing for refrigerating systems. A compressor shaft 11 is journaled in bearings 12 of said casing and has one end extending outwardly therefrom as indicated at 11ª. A seal member 14 is loosely arranged on said shaft and bears against one side of the bearing through which the end 11ª projects and said seal member is provided with a concave seat 14ª in which is seated the convex face 15 of a seal member 16 which latter is fixed to shaft 11. Said seal members are preferably held in proper sealing engagement with each other by means of a coil spring 17 which maintains said sealing members under pressure necessary to prevent the fluid contained in the casing from escaping outwardly through the shaft opening, without, however, creating excessive friction between said members during the operation of shaft 11.

A fly wheel 18 is arranged on the projecting end 11ª of shaft 11 and said fly wheel consists of two sections, namely, the driving section 19 which is loosely mounted relative to shaft 11 and the driven fly wheel section 20 which is fixed relatively to said shaft. Section 20 is mounted directly on end 11ª, being provided with a sleeve extension 21, the end of which is engaged by the enlarged end 22 of a screw 24 which latter is screw-seated in the projecting end 11ª. A friction washer 25 is interposed between fly wheel section 20 and the corresponding bearing 12 of casing 10. Driving fly wheel section 19 is provided with a tubular hub 26 which is loosely disposed on sleeve 21 and has a slight axial movement relative thereto. This section 19 is provided with an annular flange 19ª over which operates a belt 27 whereby said section 19 can be actuated. Said flange extends toward the driven section 20 and preferably encloses the same as shown in Figure 1. Driven section 20 is provided with an annular flange 20ª which extends toward section 19 and is spaced inwardly from the flange 19ª thereof. The inner face 20ᵇ of flange 20ª is adapted to be frictionally engaged by shoes or segments 28 which are pivotally mounted on section 19 at 29 and are preferably provided with suitable friction material, such as brake lining 30, to provide a better grip between said segments 28 and the face 20ᵇ of flange 20ª.

Sections 28 are actuated by arms 31 which are pivotally mounted at 32 on section 19 and are provided with extensions 34, the ends of which engage notches 35 formed in the free end of each segment 28. Each arm 31 has mounted thereon a weight 36 whereby, when the section 19 is actuated, arms 31 are caused by centrifugal action to move outwardly on pivots 32, thereby causing segments 28 through the interengagement of extensions 34 with notches 35 to swing on pivots 29 into engagement with face 20ᵇ of driven section 20, thus establishing interengagement between the fly wheel sections 19 and 20.

Springs 37 are connected at one of their ends to arms 31 and serve to hold the latter in contracted or inoperative positions.

In practice, it is found that where weighted arms are used to operate the frictional segments that said arms will be moved by centrifugal action prematurely, thereby effecting an interengagement of the fly wheel sections before the driving element has attained its full operating speed. Also this premature movement of arms 31 causes dragging of the segments 28 against the face 20ᵇ before the complete interengagement of the fly wheel sections 19 and 20 is effected. If springs 37 were made sufficiently strong to resist the untimely actuation of arms 31, the interengagement of the fly wheel sections would not be positive due to the force exerted by said springs against said arms which would counteract the centrifugal force.

In order to provide an effective interengagement between said fly wheel sections and at the same time provide a device which is readily responsive to the proper speeds, I provide means for arresting arms 31 in their outward movements before segments 28 are brought into engagement with face 20ᵇ, said means being centrifugally operated to release arms 31 when a predetermined speed has been reached.

This means comprises auxiliary arms 38 pivotally mounted on fly wheel section 19 at 39 and having their free ends 38ª arranged adjacent to and in definite relation with the free ends 31ª of arms 31. Each end 38ª is provided with a shoulder 38ᵇ which, when arm 38 occupies retracted position, lies in the path of movement of the end 31ª of the corresponding arm 31 and prevents the complete pivotal movement of said arm 31 as long as weighted arm 38 occupies retracted position. Auxiliary arms 38 are held in retracted positions preferably by having one of the ends of springs 37 connected thereto so that each spring 37 is utilized to hold in retracted positions one of the arms 31 and the auxiliary arm 38 of the opposite arm 31. When arms 31 occupy retracted positions, the ends 31ª thereof are spaced suitable distances from shoulders 38ᵇ of arms 38, thereby permitting said arms 31 to move a predetermined distance before being arrested by auxiliary arms 38, which latter are operable at a greater speed than arms 31. Consequently arms 31 and segments 28 are held in readiness to complete their outward movements as soon as released. When the fly wheel section 19 reaches its normal or operating speed, weights 38 are actuated by centrifugal action and move away from the corresponding ends 31ª, thereby releasing said arms 31 so that the latter can move outwardly the full distance and bring segments 28 into operative engagement with the face 20ᵇ of driven fly wheel section 20.

The initial or partial movement of arms 31 outwardly is utilized to release the seal members 14 and 15 of auxiliary sealing pressure just before the shaft 11 is set in operation. This axial sealing pressure is applied to sealing members 14 and 16 while the shaft 11 is stationary and it is the purpose to prevent the escape of fluid from casing 10 through the shaft opening. In some apparatus, such as compressors, used in connection with refrigerating systems, the pressure increases in the casing when the compressor is stationary due to the expansion of the refrigerant in said casing, and it is therefore desirable to increase the pressure in the sealing members. However, when the machine is in operation this excessive sealing pressure is unnecessary as the fluid pressure in the casing is reduced and it is undesirable as the friction between the sealing members would be too great and would result in rapid wear of said sealing members. This auxiliary pressure is supplied to the sealing members by blocks or weights 36 which are provided with inwardly projecting beveled extensions 36ª, the inclined faces of which, when blocks 36 occupy retracted positions, bear against the inclined or convex face of a washer 40 which is arranged on tubular extension 21 and bears against pins 41. Washer 40 is held against axial movement by pins 41 which are freely seated in the hub portion of section 20 and bear against friction washer 25.

The opposite faces of extensions 36ᵃ bear against one end of tubular portion 26 of section 19, thereby exerting axial pressure against said fly wheel section 19 in a direction away from casing 10. Section 19 is allowed slight longitudinal movement so that the outer end of tubular portion 26 is brought into engagement with head 22 of screw 24, thereby transmitting the axial pressure produced by blocks 36 against said tubular portion 26 to shaft 11 and through said shaft to sealing member 16 causing the convex face 15 thereof to be brought by said pressure into a more complete sealing contact with the concave seat of member 14 when the machine is stationary.

As soon as arms 31 are actuated, the tapered extensions 36ᵃ are moved away from tubular portion 26 and washer 40, thereby removing the axial pressure directed against shaft 11 and relieving seal members 14 and 16 of auxiliary sealing pressure so that when section 20 and shaft 11 are set in operation by the releasing of weighted arms 31, sealing members 14 an 16 are held only under normal pressure in engagement with each other.

Blocks 36 are adjustable on arms 31 to render said arms operable by centrifugal action at the required speed. A set screw 42 is screw-seated in each block and engages arm 31 and serves to lock the block in adjusted position. The provision of supplemental arms 38 not only provides simple means for relieving the seal members from the increased pressure before the interengagement of the fly wheel sections, but also an efficient interlock is provided between the fly wheel sections when arms 31 are released. This is due to the fact that arms 31 are operable at lower speed than supplemental arms 38; consequently when arms 38 are actuated, driving section 19 has reached its proper speed and arms 31 which have been operated by centrifugal action at a slightly lower speed are released and move to complete their outward movement and bring segments 28 into engagement with section 20 at increased pressure. In this manner, segments 28 are brought into operation at a speed greater than that required to actuate arms 31 and when section 20 is cut in the speed of the driving section will not fall below the speed required to operate arms 31, thereby avoiding dragging of segments 28 and any material fluctuation in the speed of the device.

I claim:

1. A fly wheel comprising a plurality of sections, a pair of weighted members constituting primary centrifugal means for effecting an interengagement and disengagement of said sections, and a pair of pivotally mounted arms forming auxiliary centrifugal means, said arms normally having their free ends disposed in the path of and spaced from said weighted members to prevent the completion of the centrifugal movement thereof to prevent interengagement of said fly wheel sections until the increase of speed actuates said auxiliary means to release said primary means whereby the completion of the operating movement of the primary means is effected at a higher rate of speed than the speed necessary to operate said primary centrifugal means.

2. A fly wheel mechanism comprising a driving section and a driven section, clutching means for interengaging said sections, primary centrifugally operable arms pivotally mounted on said driving section for actuating said clutching means at a predetermined speed, and auxiliary centrifugally operable arms pivotally mounted on said driving section independently of said primary arms and operable at a higher rate of speed relatively thereto, the free ends of said auxiliary arms being provided with shoulders normally spaced from the free ends of said primary arms and lying in the path of movement thereof whereby said primary arms are partially operated at a certain speed and the completion of the operating movement of said clutching means and said primary arms is effected at a higher rate of speed upon actuation of said auxiliary arms.

3. In a device of the class described, the combination with a shaft, of a bearing therefor, a pair of fly wheel sections arranged on said shaft, clutching means for interengaging said sections, centrifugally operable primary members for actuating said clutching means, centrifugally operable auxiliary members for limiting the operating movements of said primary members and releasing the latter at a comparatively higher rate of speed, a seal member loosely arranged on said shaft adjacent to one end of said shaft bearing, a seal member fixed to said shaft in sealing pressure contact with the first seal member, beveled extensions on said primary members for coacting with said seal members whereby one of said seal members is displaceable axially by said extensions when said primary members occupy retracted positions, thereby increasing the pressure contact between said seal members when said primary members are stationary or operating at low speed, said beveled extensions being disengageable from said seal members to remove said increase in pressure when said primary members are actuated centrifugally.

4. In a device of the class described, the combination of a revoluble shaft, a pair of fly wheel sections, one of which has a fixed relation with said shaft and the other is loosely disposed relative thereto, clutching means for interengaging said fly wheel sections, primary centrifugally operable means for actuating said clutching means, auxiliary centrifugally operable means operable at a higher rate of speed than said primary members, said auxiliary members being adapted to limit the centrifugal movements of said primary means to prevent the completion of the movement thereof and the operation of said clutching means and said auxiliary means being adapted to release said primary centrifugal means when said auxiliary means are actuated, a seal for said shaft comprising two members in sealing contact with each other, and beveled extensions carried by said primary means for coacting with said seal members whereby one of said members is displaced relative to the other to increase the pressure contact between said seal members when said primary means are inactive, said beveled extensions being disengageable from said seal members when said primary means are actuated by centrifugal action.

5. A device of the class described comprising in combination a driven revoluble member, a driving revoluble member, clutching means carried by said driving member for interengaging said members, primary centrifugally operable arms for actuating said clutching means, and auxiliary centrifugally operable arms for limiting, when in retracted positions, the operating movements of said primary arms, whereby the latter are only partially operated during the effective speed and are released when said auxiliary arms are actuated at a higher speed, whereby said clutching means is rendered active by said primary arms at a speed considerably greater than that required to operate said primary arms.

6. A device of the class described comprising in combination a revoluble shaft, a driving member loosely mounted thereon, a driven member fixed to said shaft, clutching means carried by said driving member for interengaging said members, primary centrifugally operable arms carried by said driving member for actuating said clutching means, auxiliary centrifugally operable arms carried by said driving member operable at a higher rate of speed than said primary arms and adapted when in contracted positions to limit the operating movement of said primary arms whereby the latter are only partially operated during their effective speed and are released to operate said clutching means upon the centrifugal operation of said auxiliary arms, seal means for said shaft including a pair of seal members, and beveled extensions on said primary arms coacting with said seal members for increasing the sealing contact pressure therebetween when said primary arms occupy retracted positions, said beveled extensions being disengageable from said seal members when said primary arms are actuated, thereby placing said seal members under normal pressure.

7. A device of the class described comprising in combination a revoluble shaft, a driving revoluble member loosely mounted on said shaft, a driven revoluble member fixed to said shaft, clutching means carried by said driving member for interengaging said members, primary centrifugally operable arms carried by said driving member for actuating said clutching means, auxiliary centrifugally operable arms also carried by said driving member and operable at a higher rate of speed than said primary arms and adapted when in retracted positions to limit the operating movements of said primary arms, a shaft seal for said shaft including a pair of members, one of which is stationary and the other fixed on said shaft, and beveled extensions on said primary arms for coacting with said seal members and exerting pressure against said shaft in axial direction when said primary arms occupy retracted positions whereby the sealing contact between said seal members is increased above normal when said primary arms are inactive and is brought to normal when said primary arms are actuated and said means on said primary arms are rendered inactive.

8. A device of the class described comprising in combination a driving revoluble member, a driven revoluble member, said members being arranged in coaxial cooperative relation, clutching means carried by said driving member for engaging said driven member, primary centrifugally operable arms carried by said driving member for actuating said clutching means, auxiliary centrifugally operable arms also carried by said driving member and operable at a higher rate of speed than said primary arms, said auxiliary arms being adapted when in retracted positions to limit the initial operating movements of said primary arms, a shaft seal comprising a pair of seal members, one of which is stationary and the other revoluble with said driven member, and beveled extensions on said primary arms for coacting with said seal members to increase the contact pressure between said seal members when said primary arms occupy retracted positions and to remove such additional pressure when said primary arms are actuated, the initial operating movements of said primary arms being sufficient to disengage said beveled extensions from said seal members, said clutching means being operable only when said primary arms are released by said auxiliary arms.

In testimony whereof I hereunto affix my signature this 14th day of July, 1926.

JOHN O. CARREY.